Dec. 6, 1949 S. G. ISSERSTEDT 2,490,628
MOTOR DRIVEN LEVELING SUPPORT
Filed Sept. 23, 1942
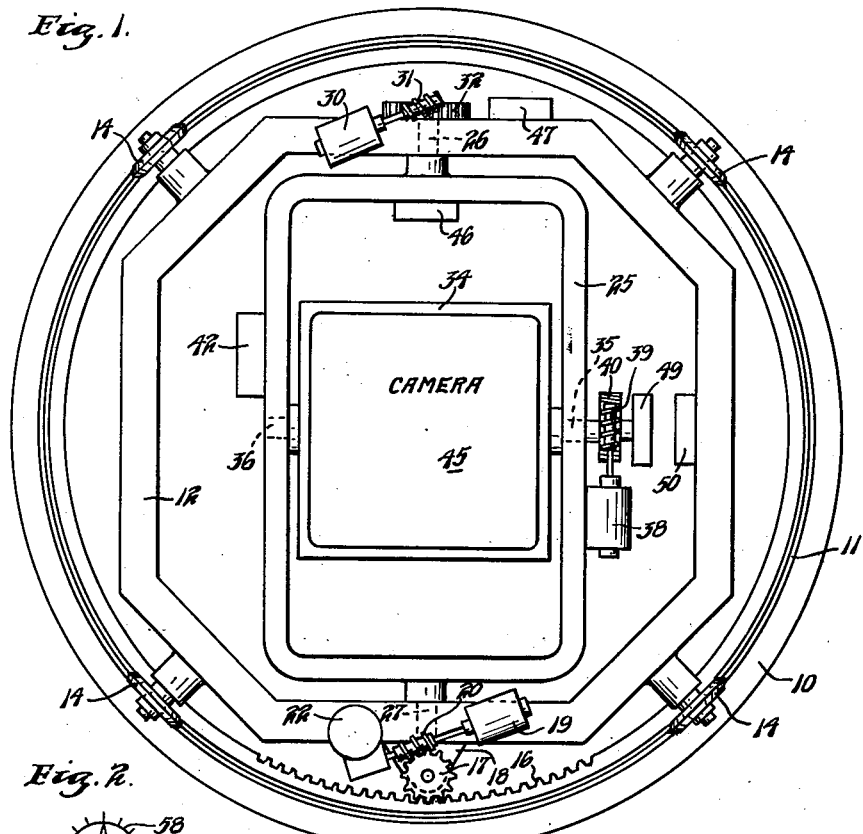
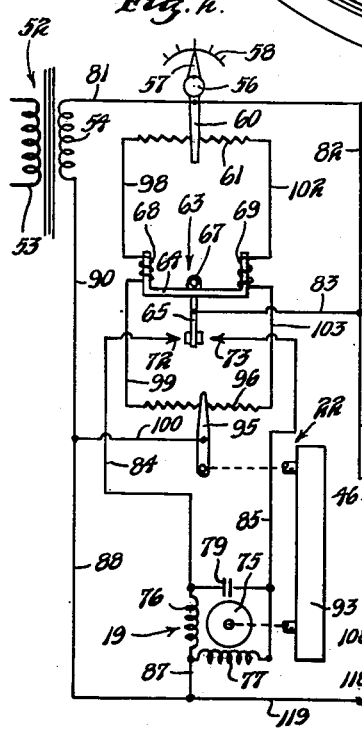
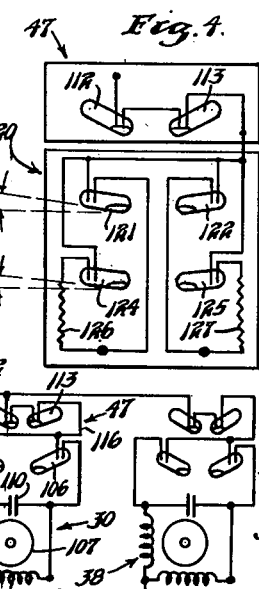
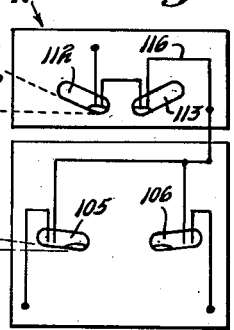
INVENTOR.
SIEGFRIED G. ISSERSTEDT
BY
George H. Fisher
ATTORNEY Patented Dec. 6, 1949

2,490,628

UNITED STATES PATENT OFFICE 2,490,628

MOTOR-DRIVEN LEVELING SUPPORT

Siegfried G. Isserstedt, Toronto, Ontario, Canada, assignor to Minneapolis-Honeywell Regulator Company, Minneapolis, Minn., a corporation of Delaware Application September 23, 1942,
Serial No. 459,439½

4 Claims. (Cl. 318—19)

The present invention is directed to a leveling support for cameras and other devices which are carried by such vehicles as airplanes which are subject to various inclinations from a normal or horizontal position.

An object of the invention is to provide an antomatic leveling device adapted to be mounted on an object subject to inclinations from a normal position.

Another object of the invention is to provide an aerial camera mount which will automatically maintain a camera in level position even though the airplane itself is subject to rolling and pitching movements.

Another object is to provide such a levelling support in which the camera or other device may be positioned about a vertical axis in order to align the device with the actual direction of flight and to compensate for drift.

It is also an object of the invention to provide a remote control for the adjustment of the device about a vertical axis, together with a remote indicator for such adjustment.

A further object of the invention is to provide a motorized aerial C-A-M-E-R-A leveling device in which the C-A-M-E-R-A is supported in a gimbal which is in turn arranged to rotate about a vertical axis with respect to the airplane.

Another object is to provide a leveling device equipped with motor means and gravity responsive motor control means, the motor control means being adapted to deenergize the motor means when the angle of tilt is beyond a predetermined degree.

Another object is to provide a leveling device rotatable about a vertical axis in which the various motors are so disposed as to be substantially in balance.

Further objects and advantages of my invention will be apparent from the following detailed description, claims, and drawing, in which Figure 1 is a plan view of an automatic aerial camera leveling device embodying my invention, Figure 2 is a schematic wiring diagram of the control apparatus associated with the device of Figure 1, Figure 3 shows the gravity responsive motor control means in more detail than it is shown in Figure 2, and Figure 4 shows a modification of the gravity responsive motor control means of Figure 3.

Aerial cameras, especially those used in aerial survey work, are commonly mounted in a support which permits universal movement of the camera through a limited range. This arrangement enables the camera operator to keep the camera approximately level through manual manipulation even though the airplane rolls and pitches due to uneven air conditions. As indicated above, the present invention provides a way to automatically maintain an aerial camera in level position during flight. Not only does this arrangement relieve an operator from this task but it also provides more accurate control than may be had manually.

It is also common practice to provide means for adjusting the camera about a vertical axis in order that the camera may be lined up with the actual direction of flight even though a cross wind is causing the airplane to drift. The invention includes means for adjusting the camera in "azimuth" about this vertical axis from a remote point such as the pilot's station.

A camera leveling device incorporating the various features of my invention is shown in Figure 1 of the drawing. The electrical connections have been omitted from Figure 1 since it is felt that incorporating them therein would confuse rather than clarify the disclosure. Consequently they are illustrated diagrammatically in Figure 2.

Referring now to Figure 1, a supporting ring 10, which is adapted to be carried in a normally horizontal position in the interior of an airplane, and above an opening in the bottom thereof, has a V-shaped annular groove 11 in its upper surface. An octagonal frame 12 is provided with four rollers 14 which are so shaped as to engage the V-shaped groove 11 in the ring 10. The frame 12 is supported by the ring 10 through the rollers 14 so as to be rotatable about a normally vertical axis with respect to the airplane which is carrying the apparatus.

It is common to refer to the adjustment of the frame 12 about a vertical axis as the "azimuth" adjustment. The ring 10 has a portion of its interior surface formed in the shape of gear teeth 16, which are adapted to cooperate with a pinion 17, pivotally supported by an extension 18 of the frame 12 so as to rotate about a vertical axis. An electric motor 19 carried by the frame 12 is adapted to turn the pinion 17 through a worm 20. The motor 19 is reversible and will be described more fully in connection with the wiring diagram of Figure 2. An electrical follow-up device 22 is also positioned by the motor 19. The follow-up device 22 and its operation will also be described more fully in connection with Figure 2.

A gimbal ring 25 is pivoted in the frame 12 on trunnions 26 and 27, so that the gimbal ring 25 may rotate about a normally horizontal axis. A reversible electric motor 30 carried by the frame 12, cooperates through a worm 31 with a gear 32 which is fixed on the trunnion 26. For the purpose of simplicity in illustration, the motors 19 and 30 have been shown to be relatively small. Actually the motors 19 and 30 must be capable of considerable power and therefore are fairly heavy. The motor 30, for instance, must be capable of adjusting the gimbal ring 25 with respect to the frame 12 rapidly enough to compensate for movements of the airplane in fairly rough air. It should be noted that the motors 19 and 30 have been mounted on the frame 12 at points diametrically opposed with respect to the vertical axis. Thus, the motors 19 and 30 impose no eccentric load which would tend to load the motor 19 unevenly for different positions of the frame 12 when the ring 10 is tilted from its normally horizontal position.

A camera supporting member 34 is pivoted in the gimbal ring 25 on the trunnions 35 and 36, so that the member 34 may rotate about a normally horizontal axis. A reversible electric motor 38 drives a worm 39 to position a gear 40 which is fixed to the trunnion 35. The electric motor 38 is supported by the gimbal ring 25 at one side of the axis of the gimbal ring extending through trunnions 26 and 27, and a counter-weight 42 is mounted on the opposite side of the gimbal ring to counterbalance the motor 38. It should be noted that the weight 42 is so positioned that it counter-balances motor 38 not only about the horizontal axis extending through trunnions 26 and 27, but also about the vertical axis of the device. An aerial camera 45 is carried by the camera supporting member 34. The gimbal ring 25 together with the camera supporting member 34 constitutes a gimbal which carries the camera 45 in the airplane.

The reversible electric motor 30 is controlled by a first gravity responsive switching means 46, which is carried by the gimbal ring 25 and by a second gravity responsive switching means 47, which is carried by the frame 12. The switching means 46 and 47 will be more fully described in connection with Figures 2, 3 and 4. The reversible electric motor 38 likewise is controlled by a first gravity responsive switching means 49, fixed with respect to the camera supporting member 34, and also by a second gravity responsive switching means 50, carried by the frame 12. The switching means 49 and 50 will also be described in connection with Figures 2, 3 and 4.

By tilting of the gimbal ring 25 on its trunnions 26 and 27, and by tilting of the supporting member 34 on trunnions 35 and 36, the camera 45 may be maintained in level position, regardless of inclinations of the ring 10.

The reversible electric motors 19, 30 and 38 of Figure 1 are automatically controlled and the automatic control circuits therefor are shown in Figure 2. Alternating current for operating the various reversible motors is supplied by a transformer 52, which includes a primary winding 53 and a low voltage secondary winding 54.

The angular position of the frame 12 with respect to the ring 10, and therefore with respect to the airplane, is controlled remotely by means of a manually adjustable knob 56. The knob 56 positions a slider 60 and a pointer 57, which cooperates with a stationary scale 58. The scale 58 may be suitably calibrated, and ring 10 may be properly oriented when it is being installed in the craft, so that pointer 57 cooperates with scale 58 to indicate the angular position of the camera mount with respect to a line passing through the nose and tail of the aircraft. If the operator sets the knob 56 so that the angle indicated on scale 58 corresponds to the angle of drift of the aircraft, then the camera is positioned, by the mechanism described below, so as to be aligned in azimuth, with the line of flight of the aircraft.

Slider 60 is actuated by knob 56 and cooperates with an electrical resistance 61. The position of the slider 60 on the resistance 61 determines the deenergized position of the motor 19 and hence the position of the frame 12 with respect to the ring 10.

A balanced relay 63 has an armature 64 carrying a contact blade 65, the armature 64 being pivoted at 67. The position of the armature 64 and hence of the contact blade 65 is determined by the relative energization of relay coils 68 and 69. The relay 63 also includes a pair of stationary contacts 72 and 73, the contact blade 65 engaging the contact 72 when the coil 68 is more highly energized than coil 69, and engaging the contact 73 when the coil 69 is more highly energized than the coil 68. When the energization of the coils 69 and 70 is substantially equal the contact blade 65 takes a mid-position as illustrated.

The motor 19 is of the split-phase induction type and includes an armature 75 and two windings 76 and 77. The motor 19 also includes a condenser 79 through which one or the other of the windings 76 or 77 is energized. The current flowing through the winding which is energized through the condenser 79 leads the current through the other coil in time phase by substantially 90 electrical degrees. The direction of rotation of the armature 75 depends on which of the two windings is energized through the condenser 79. Alternating electric current is supplied to the motor 19 from the upper terminal of the secondary 54 of the transformer 52, through conductors 81, 82, and 83, and the switch blade 65 of the relay 63. When the winding 68 of the relay 63 is more highly energized, the contact blade 65 engages the contact 72 and current flows through the contact 72, wire 84, the winding 76 and conductors 87, 88, and 90 back to the lower terminal of secondary 54. Current also flows through the condenser 79 and the winding 77 in series. The current in the winding 77 therefore leads the current in the winding 76 by substantially ninety electrical degrees and the armature rotates, for example, in a clockwise direction. When the coil 69 of the relay 63 is more highly energized than the coil 68, the switch blade 65 engages the stationary contact 73, and the motor 19 is energized through the wire 85 so that current flows directly through the winding 77 and flows through the winding 76 by way of the condenser 79.

The current flowing through the winding 76 now leads the current flowing through the winding 77 by substantially ninety degrees and the armature 75 rotates in the opposite, or, to carry on the example, counter-clockwise direction.

The follow-up device 22 referred to in connection with Figure 1 includes a reduction gear box 93, which mechanically interconnects the armature 75 of the motor 19 and a slider 95 which engages an electrical resistance 96, in a circuit including the coils of the balanced relay 63 and the resistance 61. The relay coil 68 is energized from the secondary 54 of the transformer 52 through the conductor 81, slider 60, the portion of the resistance 61 to the left of the slider 60, a conductor 98, the relay coil 68, a conductor 99, the portion of the resistance 96 to the left of the slider 95, and conductors 100 and 90 back to the secondary 54. The relay winding 69 is energized from the secondary 54 of the transformer 52 through the conductor 81, slider 60, the portion of the resistance 61 to the right of the slider 60, conductor 102, the relay coil 69, wire 103, the portion of the resistance 96 to the right of the slider 95, the slider 95, and conductors 100 and 90 to the secondary 54.

When the total resistance in series with each of the relay coils 68 and 69 is the same, the current flowing in each coil is the same and the armature 64 and contact blade 65 are in mid-position. If the slider 60 is moved to the left with respect to the resistance 61, the resistance in series with the coil 68 is reduced and the current through it is increased. At the same time, the resistance in series with coil 69 is increased, and the current through it is thereby decreased. Hence the coil 68 is more highly energized than the coil 69 and the contact blade 65 is moved into engagement with the contact 72 to run the armature 75 of the motor 19 in a direction such that the follow-up slider 95 is moved toward the right with respect to the resistance 96 to increase the resistance in series with the relay coil 68 and decrease the resistance in series with coil 69. When the resistance in series with the coil 68 is again equal to the resistance in series with the coil 69, the contact blade 65 again moves to its mid-position and the motor 19 is deenergized.

Likewise, when the slider 60 is moved to the right with respect to the resistance 61, the resistance in series with the coil 68 is decreased, and the resistance in series with the coil 68 is increased. The coil 69 is therefore more highly energized, and moves the armature 64 to cause engagement of blade 65 with the contact 73. The motor 19 is therefore energized to rotate in a direction such as to move the slider 95 toward the left with respect to the resistance 96 so as to increase the resistance in series with the winding 69 and decrease the resistance in series with winding 68. When the slider 95 has moved to the left sufficiently so that the total resistance in series with each of the relay coils 68 and 69 is again equal, the contact blade 65 again returns to mid-position and the motor is deenergized. Thus it will be seen that for every position of the slider 60 and of the pointer 57 which cooperates with the indicia 58, there is a definite position for slider 95 and for the frame 12, both of which are driven simultaneously by the motor 19. Hence, by properly setting the knob 56, pointer 57 and the slider 60 to compensate for the drift of the airplane, the motor 19 turns the pinion 17 to position the frame 12 and therefore the camera 45 with respect to the ring 10, so that the camera 45 is in line with the true direction of flight.

As mentioned in connection with Figure 1, the motors 30 and 38 are controlled by gravity responsive switching means. The reversible electric motor 30 which controls the angular relationship between the gimbal ring 25 and the frame 10 is controlled primarily by the gravity responsive switching means 46.

It is desired to maintain the gimbal ring 25 in a neutral position such that the axis through the trunnions 35 and 36, on which the camera is mounted is horizontal. As seen in Figure 2 and more clearly in Figure 3, the switching means 46 comprises two mercury type switches 105 and 106, which are tilted slightly in opposite directions so that when the gimbal ring 25, on which they are mounted, is in its neutral position, the circuits through both of these switches are open. The angle of tilt from normal position necessary for these switches to close their respective circuits may be ½°.

The motor 30 is of the reversible type and includes an armature 107 and windings 108 and 109, interconnected by a condenser 110. The direction of rotation of the armature 107 depends on which of the windings 108 and 109 is energized directly and which is energized through the condenser 110. When the motor 30 is energized through the mercury switch 105, current passes directly through the winding 108 and through the winding 109 by way of the condenser 110. Likewise when the motor is energized through the mercury switch 106, current passes directly through the winding 109 and through the winding 108 by way of the condenser 110. The respective modes of energization of the motor 30 result in rotation of the armature 107 in opposite directions. It will be understood that these directions of rotation are such that the armature 107, which drives the gear 32 through the worm 31, will tend to restore the gimbal ring 25 to its neutral position.

The circuit through which the motor 30 is energized also includes the gravity responsive switching means 47 which is mounted on the frame 12. The switching means 47 is illustrated in Figures 2 and 3. It includes a pair of normally closed mercury switches 112 and 113. The energizing circuit for motor 30 passes through both of these switches in series. These switches are inclined at a somewhat greater angle with respect to the horizontal than are the switches 105 and 106, and serve the purpose of stopping operation of the motor when the inclination of the airplane exceeds a predetermined angle. A suitable angle of tilt for these switches may be 20°. Hence when the airplane is tilted at an angle greater than 20° with respect to horizontal, the motor 30 is deenergized and makes no attempt to maintain the camera in its level position. This feature is desirable since it is never desired to take pictures when the airplane is tilted at a greater angle than 20°, and also because the various motors and switches are interconnected by flexible lead wires which permit only limited relative movements of the various parts. Also the camera may be of such a construction that its movements in the gimbal ring 25 and is the frame 12 must be limited in order to prevent injury of the parts. Since the mercury switches 112 and 113 are connected in series, tilting of the airplane sufficiently in either direction will result in deenergization of the motor.

The motor 30 is energized from the secondary 54 of the transformer 52 through conductors 81, 82, 115, mercury switch 112, mercury switch 113, a conductor 116, and one or the other of the mercury switches 105 and 106. If the gimbal ring 25 becomes tilted in such a direction that the mercury switch 105 is making contact, the winding 108 is energized directly and the winding 109 is energized through the condenser 110, and the armature 107 rotates in one direction. The remainder of the circuit may be traced through conductors 118, 119, 88, and 90 to the secondary 54. If the gimbal ring 25 is tilted in the opposite direction, the circuit is completed through the mercury switch 108 and the winding 109 is energized directly while the winding 108 is energized through the condenser 110 and the armature 107 rotates in the opposite direction.

The motor 38, which positions the camera supporting member 34 and the camera 45 with respect to the gimbal ring 25, is controlled by gravity responsive switching means 49 and 50, as mentioned in connection with Figure 1. The switching means 49 corresponds to the switching means 46 which controls the motor 30, and the switching means 50 corresponds to the switching means 47. The operation of the switching means 49 and 50 is also exactly the same as the operation of the switching means 46 and 47 except that they are mounted at right angles to the switching means 46 and 47, and hence respond to "pitching" of the plane about a lateral axis rather than to "rolling" of the plane about a longitudinal axis. Therefore it is not believed that it is necessary to describe either the circuits or their operation in detail. Any inclination of the camera 45 and hence of the switching means 49 from a horizontal position with respect to the axis passing through trunnions 35 and 36 results in operation of the motor 38 to correct this condition. Likewise, should the airplane nose up or down to a sufficient degree, the switching means 50 deenergizes the motor 38 so that it makes no further attempt to maintain the camera in level position.

An alternative form of gravity responsive switching means is shown in Figure 4. This device, which is generally indicated at 120, may be substituted for either of the gravity responsive switching means 46 and 49. The same limit switch means 47, previously described, is used in this modification and includes the two normally closed mercury switches 112 and 113 which open the circuit in case the airplane is tilted an excessive amount.

The switching means 120 includes a pair of oppositely inclined mercury switches 121 and 122, which are adapted to energize the motor when the camera is tilted a predetermined angle in either direction from its normal position. These switches may require a tilt of ½° from normal position in order to cause energization of the motor. A second pair of mercury switches 124 and 125 are so mounted that when the camera is tilted in a predetermined relatively small angle in either direction from its normal or level position, the motor windings will be energized through resistances 126 and 127, respectively. The switches 124 and 125 may be so mounted that an angle of tilt of ¼° in either direction from level position, results in energization of the motor. When the motor windings are energized through the resistances 126 or 127, the motor armature turns at a slower speed than when energized directly, as is the case when they are energized through the switches 121 or 122. This arrangement provides a somewhat more accurate control of the leveling of the camera 45 than is provided with the arrangement previously described. On slight inclinations of the camera, the motors are operated at slow speed to correct the condition while when a larger inclination occurs, the motors correct this larger error somewhat more rapidly.

From the foregoing description, it will be apparent that I have provided a leveling support particularly adapted for use with aerial cameras which is automatic in its operation, and therefore requires no attention from an operator. The automatic positioning of the camera is also much more accurate than is possible when an operator manually attempts to maintain the camera level. An "azimuth" control by means of which the drift of the airplane may be compensated for, has been provided, which may be remotely adjusted by the airplane pilot who has other instruments at his command to indicate the proper setting of this control.

While I have shown and described my invention as applied to a support for aerial cameras on aircraft, it will be readily recognized that the same principles may be applied to the support of other devices, and that my invention is not limited to use on aircraft.

Various features of this invention may be embodied in apparatus of different form and it is to be understood therefore, that I am to be limited only by the scope of the appended claims.

I claim as my invention:

1. In a leveling device, in combination, supporting means, a first member carried by said supporting means for rotation about a normally vertical axis, first reversible motor means supported by said first member at a point removed from said axis, and adapted to move said first member with respect to said supporting means, a second member carried by said first member for rotation about a second axis substantially at right angles to said vertical axis, second reversible motor means carried on said first member at a point substantially diametrically opposed to said first motor means for angularly adjusting said second member with respect to said first member, a third member pivoted in said second member on a third axis substantially at right angles to both said vertical and second axes, third reversible motor means carried on said second member for varying the angular relation between said third and said second members, and gravity influenced motor control means in control of said second and third motor means for operating said second and third motor means on inclination of said normally vertical axis to maintain said third member in a fixed relation with respect to horizontal.

2. In a leveling device, in combination, a support subject to inclination from a normal position, a member pivoted in said support on a normally horizontal axis, reversible motor means for positioning said member with respect to said support about said axis, first gravity influenced motor control means, said first control means being adapted to operate said motor means when said member is tilted a predetermined relatively small angle from a normal position, and second gravity influenced motor control means, said second control means being adapted to prevent operation of said motor means by said first control means when said support is tilted a predetermined relatively large angle from said normal position.

3. In a leveling device, in combination, a support subject to inclinations from a normal position, a member pivoted in said support for rotation about a normally horizontal axis, reversible motor means for positioning said member with respect to said support about said axis, first gravity influenced motor control means adapted to cause operation of said motor means at a predetermined rate when said member is tilted a predetermined angle from a normal position, and second gravity influenced motor control means adapted to cause operation of said motor means at a predetermined lower rate when said member is tilted a predetermined relatively smaller angle from said normal position.

4. In a leveling device, in combination, a support subject to inclinations from a normally horizontal position, a first member carried by said support and rotatable about a normally vertical axis, first reversible motor means carried by said first member at a point spaced from said axis and adapted to move said first member with respect to said support, a second member carried by said first member and rotatable about a second normally horizontal axis, second reversible motor means for moving said second member with respect to said first member, said second reversible motor means being substantially equal in weight to said first motor means and carried on said first member at a point spaced from said vertical axis and substantially diametrically opposed to said first motor means.

SIEGFRIED G. ISSERSTEDT.

REFERENCES CITED

The following references are of record in the file of this patent:

UNITED STATES PATENTS

| Number | Name | Date |
| --- | --- | --- |
| 898,766 | Mott | Sept. 15, 1908 |
| 1,942,604 | Kennedy | Jan. 9, 1934 |
| 2,090,812 | Schmit | Aug. 24, 1937 |
| 2,393,851 | Wills et al. | Jan. 29, 1946 |
| 2,446,096 | Moore | July 27, 1948 |

FOREIGN PATENTS

| Number | Country | Date |
| --- | --- | --- |
| 516,185 | Great Britain | Dec. 27, 1939 |